United States Patent
Ganz et al.

(10) Patent No.: US 6,584,080 B1
(45) Date of Patent: Jun. 24, 2003

(54) WIRELESS BURSTABLE COMMUNICATIONS REPEATER

(75) Inventors: Frederick M. Ganz, Nesconset, NY (US); Donald P. Burkhardt, Dix Hills, NY (US)

(73) Assignee: Aero-Vision Technologies, Inc., Hauppauge, NY (US)

(*) Notice: Subject to any disclaimer, the term of this patent is extended or adjusted under 35 U.S.C. 154(b) by 0 days.

(21) Appl. No.: 09/231,458

(22) Filed: Jan. 14, 1999

(51) Int. Cl.[7] .................................................. H04B 7/14
(52) U.S. Cl. ........................ 370/315; 370/401; 370/316
(58) Field of Search ................................ 370/270, 279, 370/293, 315, 492, 370, 356, 389, 392, 400, 401, 402, 438, 445, 479, 489, 497, 331, 328, 338; 375/132; 340/825; 455/403

(56) References Cited

U.S. PATENT DOCUMENTS

| | | | | |
|---|---|---|---|---|
| 3,823,401 A | * | 7/1974 | Berg et al. | 370/279 |
| 5,003,534 A | | 3/1991 | Gerhardt et al. | |
| 5,121,387 A | | 6/1992 | Gerhardt et al. | |
| 5,175,882 A | | 12/1992 | Higashijima | |
| 5,197,125 A | | 3/1993 | Engel et al. | |
| 5,295,154 A | * | 3/1994 | Meier et al. | 340/825 |
| 5,371,738 A | * | 12/1994 | Moelard et al. | 370/331 |
| 5,394,433 A | * | 2/1995 | Bantz et al. | 375/132 |
| 5,432,907 A | * | 7/1995 | Picazo et al. | 370/401 |
| 5,434,850 A | | 7/1995 | Fielding et al. | |
| 5,479,400 A | * | 12/1995 | Dilworth et al. | 455/403 |
| 5,634,196 A | * | 5/1997 | Alford | 370/279 |
| 5,844,893 A | * | 12/1998 | Gollnick et al. | 370/328 |
| 5,970,059 A | * | 10/1999 | Ahopelto et al. | 370/338 |
| 6,016,310 A | * | 1/2000 | Muller et al. | 370/255 |
| 6,115,376 A | * | 9/2000 | Sherer et al. | 370/389 |
| 6,195,705 B1 | * | 2/2001 | Leung | 370/331 |
| 6,233,234 B1 | * | 5/2001 | Curry et al. | 370/356 |
| 6,240,091 B1 | * | 5/2001 | Ginzboorg et al. | 370/270 |

OTHER PUBLICATIONS

Fred Halsall, Data Communications, Computer Networks and Open Systems, Addison–Wesley Publishing Company, Fourth Edition, pp. 334–346.*

* cited by examiner

Primary Examiner—Steven Nguyen
Assistant Examiner—Phuongchau Ba Nguyen
(74) Attorney, Agent, or Firm—Hoffmann & Baron, LLP (57) ABSTRACT

A wireless high speed data communication system having a host radio station connected to a source of data. The host radio station transmits data to a radio repeater that is within a line of sight. The communication system may include numerous repeaters each of which is configured to communicate with each other within a line of sight. The repeaters are also configured to communicate with users by a direct electrical connection and a line of sight wireless connection. The users may also be electrically connected to a local area network for further distribution of the data.

28 Claims, 5 Drawing Sheets

FIG. 1 WBCR Deployment

FIG. 3 Micro Node Configuration

FIG. 4 Software Components

FIG. 5 Packet Flow Diagram

WIRELESS BURSTABLE COMMUNICATIONS REPEATER

BACKGROUND OF THE INVENTION

1. Field of the Invention

The present invention relates generally to a radio communications repeater, and more particularly relates to a radio communications repeater system for high-speed data communication which enables multiple users to access a common geographically distributed radio channel.

2. Description of the Prior Art

Radio communication repeater systems receive radio signals, amplify the signals and retransmit the signals to a distant location. One type of radio communication repeater system is a half-duplex system. The half-duplex system is incapable of simultaneously transmitting and receiving radio signals. This results in a reduction of throughput rate by a factor of two, since the repeater system must first receive signals from a host radio and then retransmit the signals to another repeater or a user. Throughput is further reduced when extended coverage continues through a series of repeaters.

Another type of repeater system is a full-duplex system. Full-duplex systems use one radio channel for reception and a second radio channel for transmission. This type of repeater system does not suffer the throughput rate limitation described in the half-duplex radio system. However, to achieve necessary channel isolation, the frequencies are normally widely separated and assigned by the United States Government Federal Communications Commission (FCC) in channel pairs. The bandwidth is fixed or constrained to a single channel. The full-duplex method can be achieved by segregating the single channel into transmit and receive time slots, which reduces the possible data throughput by one-half.

One method to regain lost data transmission throughput is to encode the communications data stream to fit more data into a fixed bandwidth. These encoding schemes require increasingly higher levels of communication channel signal-to-noise ratios, which in some applications can be realized by increasing the transmitter power by a factor of two or more. However, in many communication applications the FCC restricts the radio frequency power and the antenna directional characteristics which can be used in a radio channel. This limits the encoding of the communication data streams and the throughput rate.

Many communication applications require wireless multi-point access, in contrast to simple point-to-point data access. Wireless multi-point access requires a repeater to effectively serve multiple users simultaneously at remote locations. In this situation, the repeater cannot translate all communication signals from one side to the other and must allocate time slots in which the different remote radios can communicate with a host radio. This is achieved by a process known as polling. Polling leads to inefficient spectrum utilization because time slots go unused when a polled radio has no data to transfer.

Additionally, there are radio communication applications where extended coverage areas are desired and line-of-sight conditions do not exist. This problem is typically circumvented using high radio towers to establish line-of-sight conditions. Radio towers are expensive to construct, and are located many miles apart. Radio transmitters to reach the longer range between radio towers may require higher transmit power than is allowed by the FCC. Moreover, use of highly directional antennas may restrict use to point-to-point only, precluding multi-point applications. Hence, the use of a non-tower based radio communication repeater station may be the only alternative, even though it lacks full data speed throughput and cannot operate in a multi-point access mode.

Thus, the present invention is directed towards overcoming the disadvantages of conventional radio communication repeaters and multi-point access radio communication repeaters.

OBJECTS AND SUMMARY OF THE INVENTION

It is an object of the present invention to provide a low cost, compact repeater for radio communications.

It is another object of the present invention to provide a radio communications repeater which is capable of full data rate transfers in half-duplex systems.

It is a further object of the present invention to provide a radio communications repeater which can support multi-communication protocols, including but not limited to TCP/IP and Ethernet.

It is still another object of the present invention to provide a radio communications repeater which provides for multi-user access for both remote wireless systems and locally wired systems to the repeater site.

It is yet another object of the present invention to provide the ability to segment data traffic onto two or more separate segments, through the use of frequency channel separation, data stream encoding and/or spacial separation techniques (antenna radiation pattern separation).

It is yet another object of the present invention to provide for remote monitoring and maintenance for controlling of a radio communications repeater.

It is yet another object of the present invention to act as a firewall to isolate remote segments.

It is yet another object of the present invention to enable burstable data communication protocols to enhance data distributions to users in a multi-user (access) environment which effectively provides high communication speeds.

A wireless high speed data communication system constructed in accordance with one form of the present invention includes a host radio station connected to a source of data. The host radio station transmits and receives data to and from at least one wireless communication repeater within line of sight of the host radio station. The repeater is configured to communicate with at least one end user by either a direct electrical connection or a wireless connection. The repeater may also transmit and receive data to another repeater within its line of sight yet beyond the line of sight of the host radio station. The data source, connected to the host radio station, can be private data or data accessed and/or delivered to the Internet.

The repeater has at least one radio/data link element for receiving and transmitting data packets between the repeater and the host radio station. A processor controls the data flow within the repeater. Data may be communicated between the repeater and the host radio station, the repeater and the users, and the repeater and the other repeaters. The repeater communicates with the end users through a direct electrical connection and/or a wireless connection. Additional radio transceivers may be included in the repeater to communicate the data from the host radio station to a second repeater.

A method of routing data in the form of packets formed in accordance with the present invention includes the steps of receiving data packets by a radio/data link element of a repeater and using a forwarding engine TCP/IP stack to route data packets via a packet exchange bus to their proper addresses. The method may also include filtering out IP addresses which are not programmed to be received, and may include the step of monitoring data packets for the purpose of accounting.

A preferred form of the wireless high speed data communication system, as well as other embodiments, objects, features and advantages of this invention, will be appeared from the following detailed description of the illustrative embodiments thereof, which is to be read in connection with the accompanying drawings.

DETAILED DESCRIPTION OF THE PREFERRED EMBODIMENTS

Figure 1:
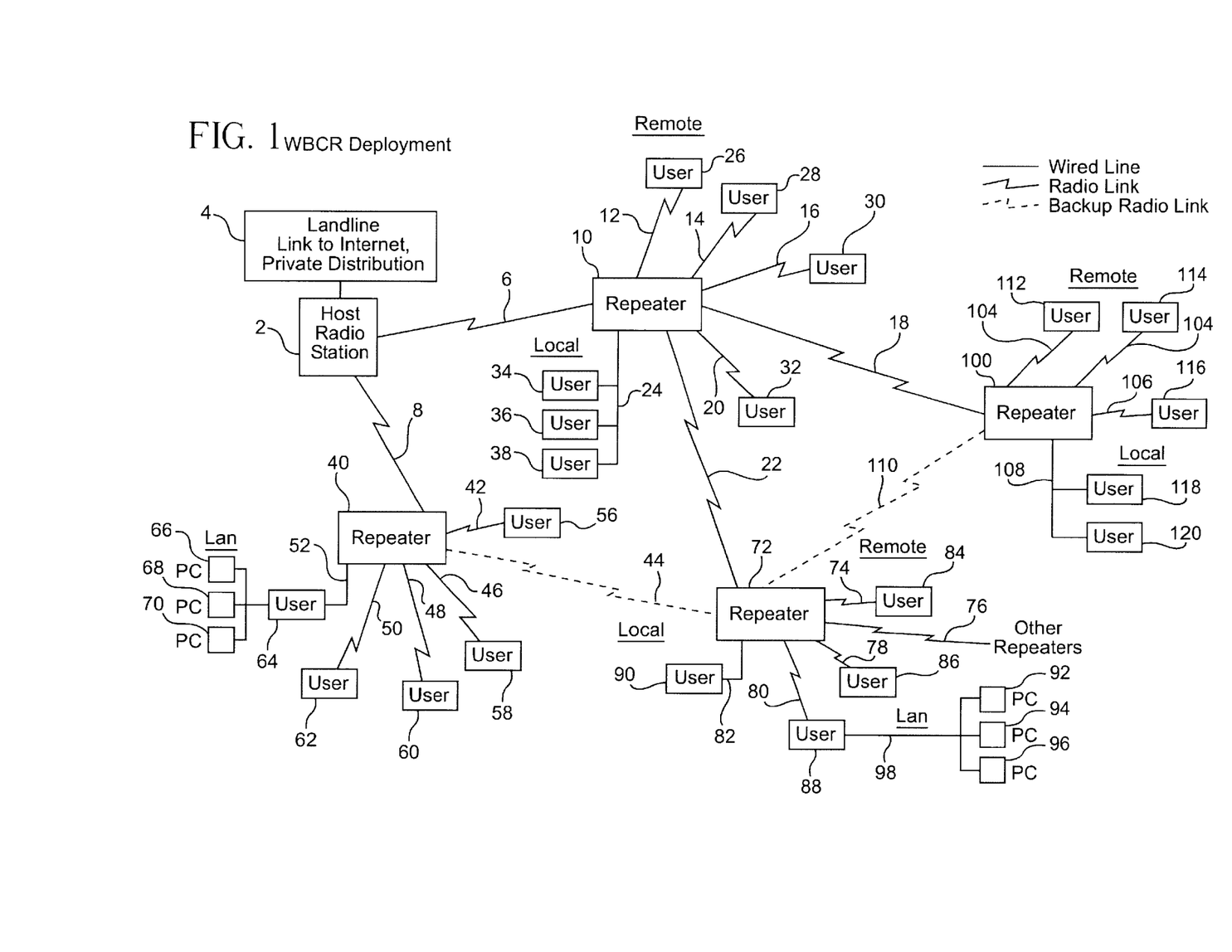
FIG. 1 is a block diagram of a wireless burstable communications repeater deployment scheme.

A block diagram of a wireless burstable communications repeater (WBCR) deployment scheme formed in accordance with the present invention is illustrated in FIG. 1. The WBCR deployment scheme may be implemented in a common geographic area or within the confine of a building. Deployment of the WBCR scheme includes: a host radio station 2, a land line link 4, a WBCR 10, a remote user 26, a physical data line 24, and a local user 34.

The host radio station 2, provides data communications from the land line link 4 (i.e., Internet or other private distribution data sources) to users 26 remotely located from the host radio station 2, by a network of WBCRs 10, 100, 72, 40. Each WBCR 10, 100, 72, 40 provides local access to users 26–32 within line-of-sight 12 of the WBCR 10, as well as local users 34–38 which are connected by a physical data line 24 to the WBCR 10.

In addition, the WBCR 10 serves as a relay for WBCRs 100, 72, and 40, which serve further remote users 112–120 and 84–90 beyond the line-of-sight of both the host radio station 2 and WBCR 10. Other WBCR sites 76 can also be sequentially connected to WBCR 10,100,72,40 within the deployment scheme.

The host radio station 2 can also access other WBCRs, such as WBCR 40, without interfering with the operations of WBCRs 10, 100 and 72. Because of a multiple access circuit within each WBCR, back-up links 44 and 110 can be established between repeaters 40 and 72 in the event that one of the primary radio links 18, 22 were to fail. The computing equipment of each user may include a single personal computer (PC) 66,92 or a local area network (LAN) 54,98 which connects multiple PC's and other computing equipment.

Figure 2:
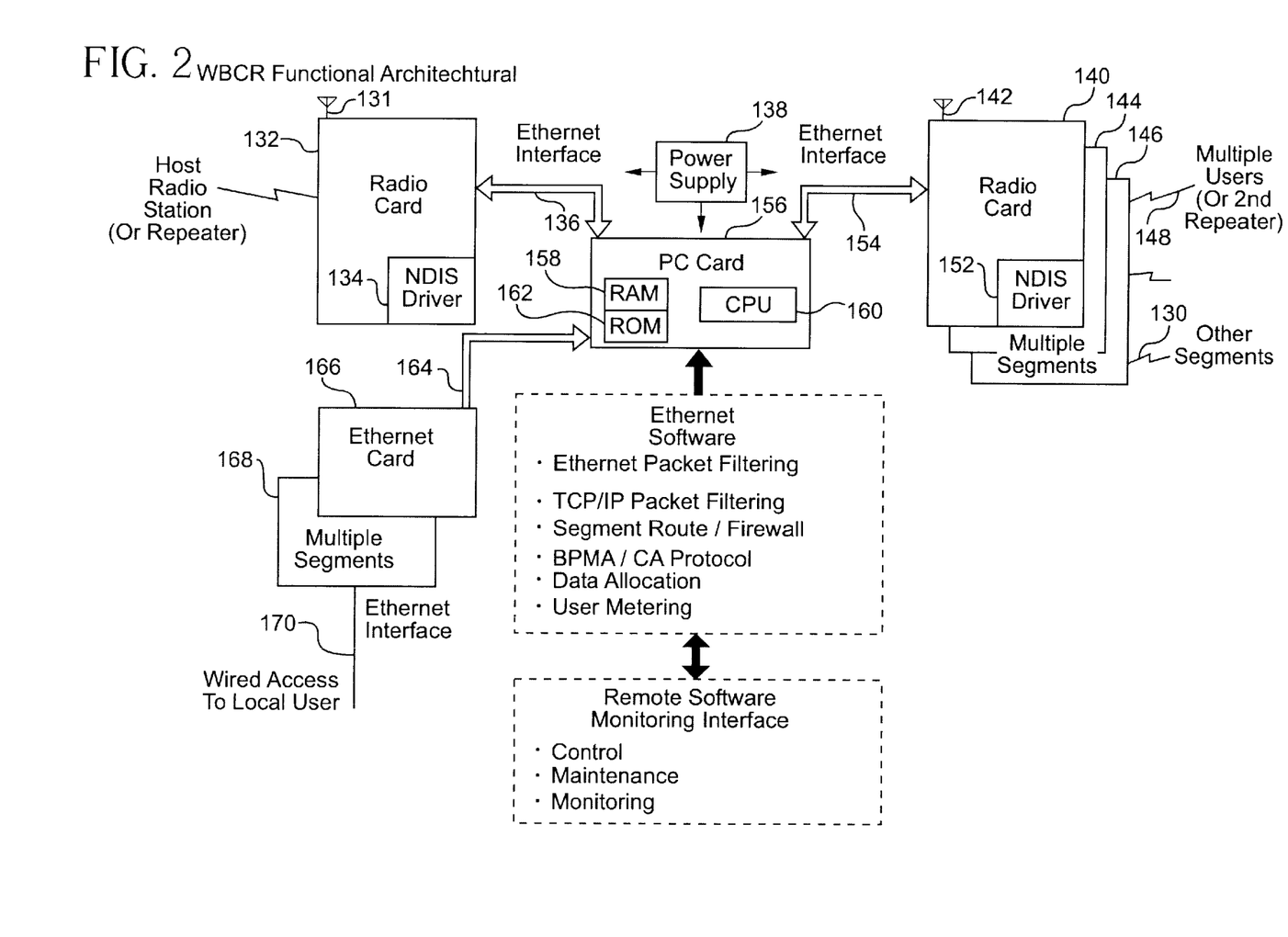
FIG. 2. is a block diagram of a wireless burstable communications repeater functional architecture.

A block diagram of a wireless burstable communications repeater (WBCR) functional architecture formed in accordance with the present invention is illustrated in FIG. 2. The functional architecture preferably includes the following: a radio transceiver circuit 132, an antenna 131, a network device interface specification (NDIS) driver circuit 134, Ethernet interfaces 136, 154, 164, 170, Ethernet circuits 166, 168, a second radio transceiver circuit 140, a second antenna 142, a second NDIS driver circuit 152; a computer circuit 156 having a random access memory (RAM) circuit 158, a read only memory (ROM) circuit 162 and a processor 160.

The radio transceiver circuit 132, provides the radio frequency link to a host radio station and, optionally, to one or more repeaters. The second radio transceiver circuit 140, provides multiple radio frequency access to remotely distributed users and/or other WBCRs. The antennas 131, 142 can be either omni or directional. Each radio transceiver circuit has a NDIS driver 134,152, which provides the Ethernet interface 136, 154, to the computer circuit 156. The computer circuit 156, performs the controlling functions within the WBCR and includes the processor 160 (e.g., 486 CPU or equivalent), the RAM circuit 158 and the ROM circuit 162. Ethernet circuits 166, 168 are included within the WBCR to provide wired access to users locally coupled to the WBCR.

The WBCR functions, such that the data packets coming from the user side, are received by the second radio transceiver circuit 140 and then temporarily buffered in the RAM circuit 158 before being retransmitted by the radio transceiver circuit 4 to the host radio station. Alternatively, when a data packet comes in from the host radio station, it can be directed to a local user at the WBCR site, by the local Ethernet card interface 170. The WBCR functions as a full data rate communications system. The full data stream transfer is accomplished by receiving data packets from the host radio station, temporarily buffering the data packets in the RAM circuit 158 and transferring the data packets to the second radio transceiver circuit 140 (user side), where the data packets are then transmitted to the user.

The WBCR "reads" each data packet in transit and directs it to the appropriate segment (i.e., out to the user radio link side, or to a user local to the repeater site via the Ethernet card). The data packets are encapsulated at different open system interconnection (OSI) levels. The lowest OSI level, a radio/data link protocol, consists of special coding that is transmitted over the airways. The radio/data link protocol typically consists of a binary sequence modulated to radio frequency (RF), containing certain radio addressing, data packet error correcting codes such as Reed-Solomon encoding, and spread spectrum chip code sets. If an error occurs within a data packet during RF transit, it is detected by the Reed-Solomon decoding and a request for a retransmission of the data packet is effected. The next OSI level is an Ethernet protocol. The Ethernet protocol is included within the radio/data link packet and provides a unique Ethernet address for each user on the network. The highest OSI level is a transmission control protocol/internet protocol (TCP/IP) data protocol, which contains information data packets sent by and requested from the user. The TCP/IP information data packets are encapsulated within the Ethernet coding and contain unique IP addresses for each user, when communicating throughout the Internet. The WBCR can access both the Ethernet addresses and the IP addresses as required for distribution to the various segments in the network, as well as distribution over the Internet.

The radio/data link level protocol implements several features unique to wireless multi-point access. Unlike the Ethernet protocol, where the entities on the local network can communicate with each other and are relatively close together (less than 800 feet), the wireless environment consists of remote entities (which can be greater than several miles) which have communication line-of-sight only to a repeater station and not to each other. The radio data link protocol operates asynchronously, providing periodic time intervals when it is in a listen mode to a remote user sites. A user site having data traffic to send will issue a request preamble to the repeater. If acknowledged by the repeater, the user site will transmit data packets to the repeater. If multiple users are requesting transmission rights, scheduling is accomplished using a burstable packet multi access/collision avoidance (BPMA/CA) protocol.

Control of packet scheduling is performed at the Ethernet level, after the radio encoding has been removed. This enables a repeater controller to select users for a transmission and allocate data packet sizes and numbers for transfer to the users. This packet allocation is an element of the burstable packet multi access/collision avoidance (BPMA/CA) protocol preferably used with the present invention. In many communications applications the duty factor usage of individual users is quite small (e.g., on the order of 2–5 percent), but when used, the user requires full bandwidth data transfer. This allows a multi-access network to be constructed with a large number of users (typically greater than 20), which ordinarily would provide each user with a reduced proportioned bandwidth of the channel. Applied to the present invention, this would preclude a key object, which is allocating to the individual user the network bandwidth for short time durations. The BPMA/CA protocol enables this by dynamically controlling the number of data packets transmitted to and from each user and further allows prioritization to certain user messages, as well as providing for asymmetric data communications (download speed versus upload speed).

The WBCR may also be segregated into multiple tiers or layers when a segment on a user end approaches capacity. If there is a high volume of users that significantly exceed a 2–5% loading factor, separate segments may be dedicated to the users. This is accomplished with the use of additional radio transceiver circuits on the user side of the WBCR, each with its own unique IP address, Ethernet and radio ID code. Depending on the specific application, segregation can be accomplished at the radio datalink level by: (1) assigning another spread spectrum chip code to that link, thereby providing isolation from other radios on the network; (2) operating a new segment on a different radio frequency; and (3) attaching directionally controlled antennas to the radios, thereby providing for spatial diversity.

Monitoring and control of the WBCR is achieved by software controlled radio/data communications, between a host radio station and the WBCR. This provides for radio link tests to be remotely conducted for each segment using a unique radio code assigned at a data link level. Throughput speeds and data packet drop rates can be measured periodically and corrective steps taken to adjust the radio parameters remotely. The controlling functions implemented as part of the BPMA/CA protocol provide for remote dynamic load balancing among the users, and individually enhancing or reducing the allowable user packet size requests, thereby ensuring efficient network utilization for all users. Basic maintenance functions are performed remotely as well, such as adding new users and user ID's, and updating user priority codes.

The system also includes basic security measures to ensure that information transmitted over the network can be accessed only by the intended end user. More specifically, by access to the IP (Internet protocol) addressing within the packets, the repeater effectively acts as a router, allowing a firewall to be enacted for a user segment as an additional security measure, in addition to the spread spectrum coding or other noise-like coding built into the radios at the radio data link level.

Figure 3:
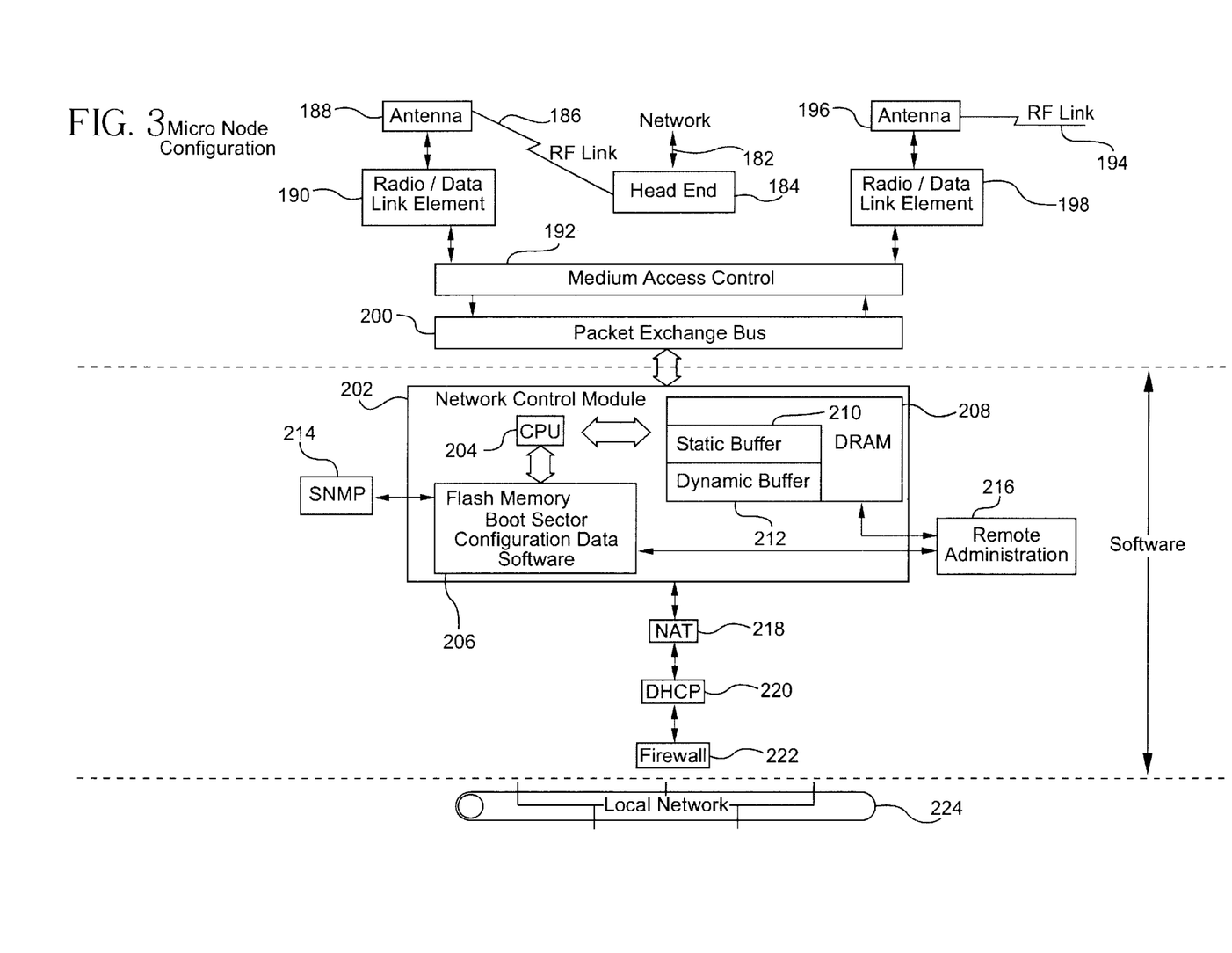
FIG. 3 is a block diagram/flowchart of a wireless burstable communications repeater.

A block diagram of an alternative design embodiment illustrating a WBCR using a combination of ASIC (application specific integrated circuit) and RISC (reduced instruction set computer) based processing hardware formed in accordance with the present invention is illustrated in FIG. 3. The WBCR as shown in FIG. 3 preferably includes: an antenna 188, a second antenna 196, a radio/data link element circuit 190, a second radio/data link element circuit 198, a medium access control (MAC) circuit 192, a packet exchange bus 200, a network control module circuit 202 having a processor 204, a dynamic random access memory (DRAM) circuit 208, a static buffer circuit 210, a dynamic buffer circuit 212, a flash memory circuit 206; a simple network management protocol (SNMP) circuit 214, a network address translation circuit 218, a dynamic host configuration protocol (DHCP) circuit 220, and a firewall circuit 222.

The radio/data link element circuit 190 includes a radio frequency transmitter circuit and a radio frequency receiver circuit. These circuits provide the radio frequency communication between a host radio station and other repeaters. The radio/data link element circuit 190, also includes a local signal processing circuit for encoding/decoding data link level transmissions. The medium access control (MAC) circuit 192 is electrically coupled to the radio/data link element circuit 190. The MAC circuit 192 provides data access for multiple radio/data link element and controls channel allocation procedures, protocol data unit (PDU) addressing, frame formatting, error checking and fragmentation and reassembly. The MAC circuit 192 may also be electrically coupled to a second radio/data link element circuit 198 and a second antenna 196 or numerous radio/data link element circuits. These additional radio/data link element circuits may be used to transmit and receive radio frequency data packets to and from remote users and other repeaters. The MAC circuit 192 is electrically coupled to the packet exchange bus (Xbus) circuit 200. The Xbus 200 is a primary bus where all data transferred within the WBCR must pass. The Xbus 200, is electrically coupled to the network control module (NCM) circuit 202. The NCM circuit 202 includes the processor 204, the DRAM circuit 208, and the flash memory circuit 206. These circuits perform per-packet processing, examination of data packets and maintain WBCR statistics. The NCM circuit 202 is electrically coupled to the simple network management protocol (SNMP) circuit 214. The SNMP circuit 214 provides the management of the WBCR distributing network equipment. The network address translation (NAT) circuit 218 is electrically coupled to the NCM circuit 202. The NAT circuit 218 may be incorporated at the user end interface to reduce the number of real IP addresses required to be assigned to the user. The dynamic host configuration protocol (DHCP) circuit 220 is electrically coupled to the NAT circuit 218 which allows users to take a personal computer and interface with the NCM circuit 202 via the NAT circuit 218. The firewall circuit 222 is electrically coupled to the DHCP circuit 220 to selectively block data traffic from the Internet to the internal network.

The antenna 188, is electrically coupled to the radio/data link element circuit 190. The antenna type can be either omni or directional. The radio/data link element circuit 190 includes a low power radio frequency transmitter circuit, a radio frequency receiver circuit, and a local signal processing circuit for encoding/decoding data link level transmissions. The radio/data link element circuit 190 operates throughout the spectrum, both licensed and unlicensed bands, and for example may operate at the microwave frequency band of 2.4–2.5 GHz. Multiple radio/data link element circuits 190, including multiple antennas 188, may be supported by a single WBCR. The radio/data link element circuit 190 preferably employs spread spectrum transmission, either using frequency hopping or direct sequence coding schemes. This decreases the chances of radio frequency jamming/interference, detection and interception of radio frequencies and provides for the capability of encryption. The radio/data link element circuits can incorporate an IEEE 802.11 specification, the disclosure of which is incorporated herein by reference, which calls for two different physical layer implementations: frequency hopping spread spectrum (FHSS) and direct sequence spread spectrum (DSSS).

In one embodiment, the FHSS may use a maximum of 79 channels in the hopping set. The first channel has a center frequency of 2.402 GHz, and all subsequent channels are spaced 1 MHZ apart. The 1 MHZ separation is mandated by the FCC for the 2.4 GHz ISM band. The channel separation corresponds to 1 MB/s of instantaneous bandwidth. Three different hopping sequence sets are established with twenty six (26) hopping sequences per set. Different hopping sequences enable multiple segments to coexist in the same geographical area, which may become important to alleviate congestion and maximize the total throughput in a single segment. Three different sets are provided to avoid prolonged collision periods between different hopping sequences in a set. The minimum hop rate permitted is 2.5 hops/s. The basic access rate of 1 Mb/s uses two-level Gaussian frequency-shift keying (GFSK), where a logical 1 is encoded using frequency F, +f and a logical 0 is using frequency F, −f. The enhanced access rate of 2 Mb/s uses four-level GFSK, where 2 bits are encoded at a time using four frequencies.

The DSSS also may use the 2.4 GHz ISM frequency band, where the 1 Mb/s basic rate is encoded using differential binary phase shift keying (DBPSK) and a 1 Mb/s enhanced rate uses differential quadrature phase shift keying (DQPSK). A 2 Mb/s enhanced rate uses differential quadrature phase shift keying (KQPSK). The spreading is done by dividing the available bandwidth into 11 sub-channels, each 11 MHZ wide and using an 11-chip Barker sequence to spread each data symbol. The maximum channel is therefore (11 chips/symbol)/(11 MHZ)=1 Mb/s if DBPSK is used. Overlapping and adjacent segments can be accommodated by ensuring that the center frequencies of each segment are separated by at least 30 MHZ. This requirement will enable only two overlapping or adjacent segments to operate without interference.

A distributed coordination function (DCF) is the fundamental access method used to support asynchronous data transfer on a best effort basis. All WBCR stations support the DCF. The DCF operates solely in the ad hoc network and either operates solely or coexists with the point coordination function (PCF) in an infrastructure network. The PCF is an optional connection oriented capability that provides contention free (CF) frame transfer. The DCF sits directly on top of the physical layer and supports contention services. Contention services imply that each station with an MSDU queued for transmission must contend for access to a channel and once the MSDU is transmitted, must re-contend for access to the channel for all subsequent frames. Contention services promote fair access to the channel for all stations. The DCF is based on a carrier sense multiple access with collision avoidance (CSMA/CA) system.

Each WBCR radio segment termination point is identified by a segment identifier (SID), which in the preferred embodiment is a unique six hexadecimal digit value that is attached to each packet sent out over the radio link. All WBCR radios communicating with each other (and segments contained there within) are set tot the same SID. A high degree of privacy and security is achieved by having 16 million possible SID settings.

Each WBCR segment can be encoded with its own unique addressing scheme, which enables segments that are in close proximity to each other to operate independently. This is accomplished by a spread spectrum modulation technique, where the modulation itself is encoded uniquely to the segment. Only radios using the same code can listen to each other. Other radios operating in the same frequency band, having a different code, are completely transparent. This allows multiple segments to be installed in a common geographical area without interfering with each other. A set of users within a common geographical area could have its own dedicated spectrum code and be completely independent from all other radios within the common geographical area. By virtue of the coding, they would also be completely secure.

In one embodiment, the information throughput in each segment is preferably at least 1.5 Mb/s, equal to a full-dedicated T-1 line rate. With an 11-bit modulation sequence, a transmission is spread over a 20 MHZ bandwidth and is essentially a noise-like signal that cannot be intercepted except by radios having the same exact 11-bit decoding sequence. There are 2048 different codes that can be installed into the 11-bit sequence, allowing in theory for as many as 2048 independent segments. In practice, due to environmental reflections and other environmental installation constraints, this number is reduced to about ten independent segments operating at the same time, in the same frequency band. Additionally, the FCC allocates five overlapping frequency bands for spread spectrum radio operation, so that up to fifty different segments can coexist at the same time. Within a given FCC allocated band, data bandwidth can be increased beyond 1.5 Mb/s for higher data transfer rate, with fewer segments used. Additionally, bands can be aggregated to provide much wider data transfer bandwidth within the WBCR.

Referring back to FIG. 3, the medium access control (MAC) circuit 192 of the WBCR is electrically coupled to the radio/data link element circuit 190. The medium access control circuit 192 provides data access for multiple radio/data link elements and controls channel allocation procedures, protocol data unit (PDU) addressing, frame formatting, error checking and fragmentation and reassembly. Data is then transferred through the packet exchange bus and onto a network control module (NCM) the operation of which is discussed in greater detail below.

Referring to FIG. 3, the packet exchange bus circuit (Xbus) 200, is a primary bus connecting key functional units within the WBCR. Data is transferred within the WBCR through the Xbus. The Xbus monitors all the data passing through the WBCR. Access through the Xbus is prioritized because several components could attempt to put data on the Xbus concurrently. Access to the Xbus is sequenced according to a transaction priority and a time of arrival priority. A transaction requesting buffer memory 208, for a data packet, has a higher priority than one sending status at an end of a transmission. The Xbus is also used to transmit signals between WBCR components, for initiating transactions associated with transmitting and receiving packets. Access to the Xbus is controlled by a separate master scheduler.

The network control module (NCM) 202 is electrically coupled to the packet exchange bus (Xbus) circuit 200. The NCM circuit 202 includes the processor 204, the DRAM circuit 208, and the flash memory circuit 206. The processor 204 performs per-packet processing and is responsible for examining data packets from incoming ports, looking up a destination address and queuing the data packets to an appropriate port for transmission. The processor 204 also collects and maintains WBCR statistics. This is achieved by monitoring the Xbus circuit 200 for data packet lengths, throughput, errors and exceptions. The DRAM circuit 208 is used for storage of temporary data, while the flash memory 206 stores firmware, configuration data and statistics. The flash memory circuit 206 is partitioned into three areas and stores WBCR software image, configuration data, and boot sector data. Most of the flash memory circuit 206 is used to store the WBCR software image. This software is changed during a WBCR software upgrade. The WBCR configuration data contains information about statistically configured addresses and other configuration parameters (e.g., packet forwarding mode, WBCR IP address/subnet mask, broadcast storm controls and full duplex configurations). When the WBCR is reconfigured, data in this section of the flash memory circuit 206 changes. The boot sector is write protected, while the WBCR repeater software image is not, thus allowing for software upgrades without opening the WBCR enclosure. This is usually achieved remotely over a network. The boot sector contains a back-up software image load capability, allowing for reload or replacement software image should the primary image become corrupted (e.g., an interrupted upgrade). The boot sector ensures that there is at least one section of the flash memory circuit 206 that always retains its data integrity, allowing the WBCR to boot up correctly every time. The NCM circuit 202 is responsible for diagnostics and error handling, WBCR configuration, implementing the Spanning Tree Protocol, in-band and out-of-band management, statistics reporting, and data prioritization protocols. In-band management refers to WBCR management through secure telenet or SNMP, and out-of-band management refers to management through a serial port connection. The NCM circuit 202 contains the embedded RMON software agents for enhancing manageability, monitoring, and traffic analysis/control.

Many conventional devices provide an unmanaged buffer system that rely solely on static buffers, which allocate fixed amounts of buffer memory to each port. This approach is restrictive in that no port can access more than the allocated amount of buffer space. As a result, the device may drop packets on ports that are out of buffer space, even though other ports are not using their allocated buffers. This results in dropped communications. The NCM circuit 202 incorporates the dynamic buffer circuit 212 and the static buffer circuit 210, so that buffers for each port or segment can be divided as needed when congested points come and go in the WBCR. This buffering scheme provides high levels of reliability during periods of peak data packet demand. The static buffer circuit 210 (typically 64 KB) ensures fairness to each segment while the dynamic buffer circuit 212 (typically 2 MB) acts as a reserve to absorb bandwidth peaks. This ensures that the ports always have sufficient memory available, even during extreme traffic loads. This capability reduces the probability of dropped data packets in delayed communications in the WBCR core, where much of the traffic aggregates under peak conditions.

The simple network management protocol (SNMP) circuit 214 provides for the management of the WBCR distributed network equipment. The SNMP circuit 214 uses agent software embedded within each network device to collect network traffic information and device statistics. Each agent continually gathers statistics, such as the number of packets received, and records them in a local WBCR systems management information base (MIB). A WBCR network management station (MNS) obtains this information by sending queries to agents MIB, a process known as polling.

Interface to the network control module (NCM) circuit 202 is achieved by using a network address translation (NAT) circuit 218 at a user end. The NAT circuit 218 can be incorporated at the user end interface to reduce the number of real IP addresses required to be assigned to the user and to achieve a basic level of security. The NAT circuit 218 is a feature of many firewalls and routers that allow one IP address to be used for many user machines. Users using NAT addressing, use private IP members specified by RFC 1918. These are designated as internal network numbers on the Internet and have no real computers attached to them. The NAT circuit 218, keeps track of MAC addresses associated with translated addresses, re-stamps all outgoing packets with its own real IP address and an alternate port. Incoming data packets with NAT addresses are translated back into the translated addresses and sent over the network to the user. The user system has no way of knowing whether it is actually on the Internet, except that operations that involve the user taking the role of a host do not work with IP NAT, since the IP address of the user is not a real valid IP address.

The dynamic host configuration protocol (DHCP) circuit 220, is a standard circuit which allows users to take a personal computer (PC) or a workstation and plug it into a DHCP enabled network. This provides all the necessary addresses, masks, default gateways, etc., allocated to them automatically without any end user intervention. The DHCP simplifies the administration of IP addresses for local networks.

The firewall circuit 222, is a standard circuit which can be placed between the WBCR access point and the user side network. Firewalls read IP addresses and protect the gates and authorize access by users, but can be programmed to pass through what ever services are required by the user without interference. Firewalls can also block traffic from the Internet to the internal network, but permit internal users to communicate with the Internet. Firewalls provide a single location where a security audit can be imposed and can be used as a tool to trace unauthorized access.

Figure 4:
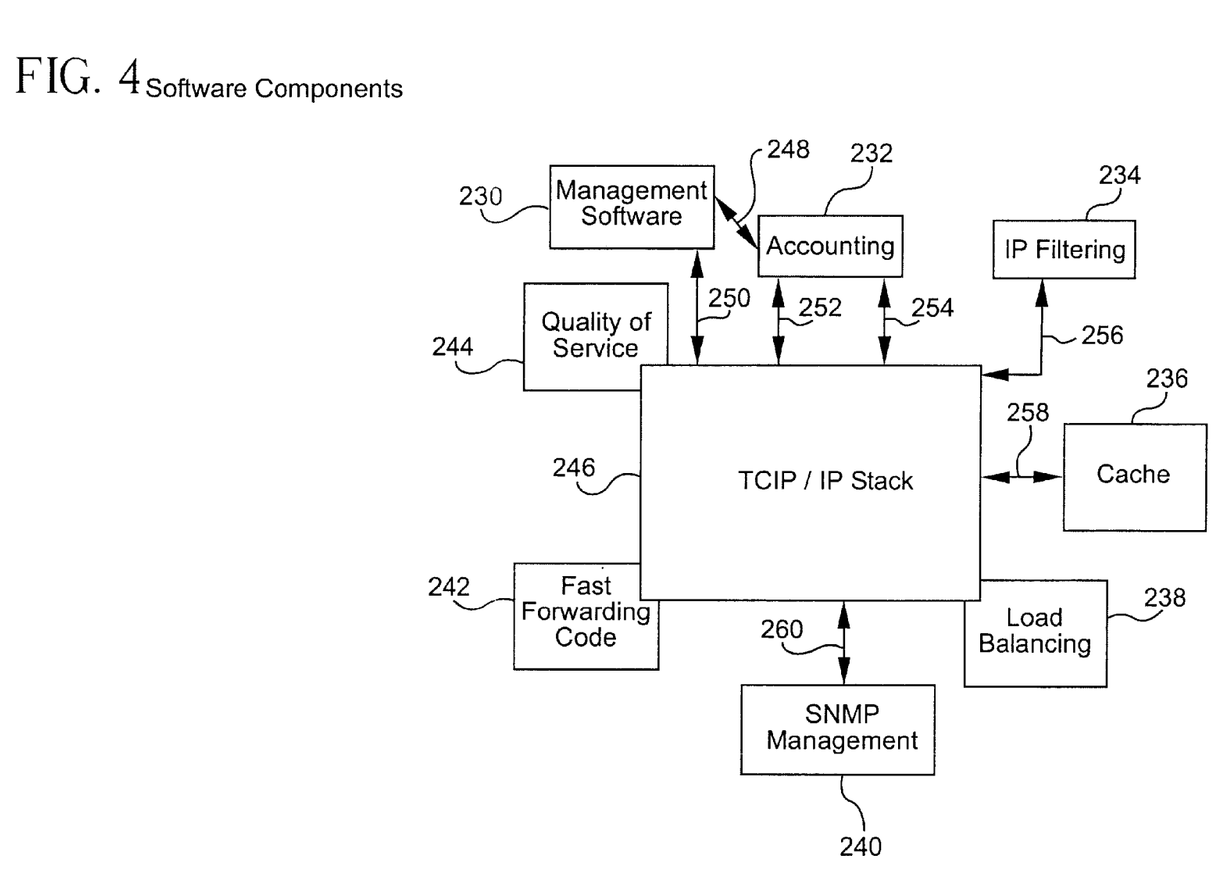
FIG. 4 is a block diagram of a wireless burstable communications repeater principal software modules and their inter-relationships.

With reference to FIG. 3, elements 214 through 222 can also be implemented in software. To further understand the present invention, FIG. 4 illustrates principal software modules and their inter-relationships. A central transmission control protocol/internet protocol (TCP/IP) stack 246, which provides software management features for appending software modules. The appended software modules are: quality of service (QoS)244, bandwidth accounting 232, IP filtering 234, fast forwarding 242, cache 236, management software 230, simple network management protocol (SNMP) 240, and load balancing 238.

The quality of service (QoS) 244, includes bandwidth management functions that provide traffic control of the WBCR, allowing improved network performance while enforcing traffic flows and other network policies. The bandwidth management functions provide for control of broadcast traffic, efficient bandwidth allocation, security within the WBCR environment, and preservation of existing open system interconnection (OSI) layer 3 structures. An additional function of the QoS 244 is dynamic bandwidth throttling technology. With this, the WBCR can maximize available bandwidth on backbone connections by throttling open network connections down to the minimum guaranteed bandwidth. While a faster interface might allow a customer to obtain bandwidth significantly higher than the guaranteed amount under some conditions (reducing the amount of time spent on the airwaves), when necessary the links can be limited to the minimum in order to handle other QoS requirements. Time-sensitive traffic (such as terminal sessions and multi-media) is combined with batch traffic (a file transfer) over the same radio segment, which could pose problems without prioritization of data.

Prioritization provides the WBCR with the flexibility to distinguish between time-sensitive traffic and non-time sensitive traffic and to give the former higher priority. A typical prioritization scheme assigns an administratively defined priority to each packet and then forwards the packet to a high, medium, or low priority queue. Network critical traffic like topology changes are automatically assigned as an urgent priority, which takes precedence over all other traffic. After all packets in the urgent-priority queue are forwarded, the router forwards packets from the other queues in an order controlled by the WBCR. The successful deployment of real-time applications such as voice and video may require that the WBCR provide a specific QoS for different applications. A QoS request is described by the flow specification that stipulates the maximum frame transmission rate, the long term average transmission rate, the maximum frame jitter, and the maximum end-to-end delay, along with the performance parameters. A resource reservation protocol (RSVP) is designed to support QoS flows by placing and maintaining resource reservations across the WBCR network.

The RSVP is receiver oriented, such that an end system may transmit an RSVP request, on behalf of a resident application, to request a specific QoS from the network. At each hop along the reverse path back to the source, each WBCR registers the reservation and attempts to provide the required QoS. If the requested QoS cannot be granted, the RSVP process executing in the WBCR returns an error indication to the host that initiated the request, or searches for additional free WBCR segments. Although RSVP is specifically designed for multicast applications, it also supports resource reservation for uni-cast and point-to-point transmissions.

Every WBCR network interface, wired and wireless, is monitored at a packet level. Snapshots of the instantaneous bandwidth usage in every direction are available at any moment and historical data is collected and distributed as necessary. The bandwidth accounting 232, for all traffic generated allows for accurate billing based on any criteria. It can be used to monitor long-term trends in utilization or to predict future bandwidth needs. The IP filtering 234, allows for certain data packets to be blocked, processed according to QoS policies and used to assess and sort according to traffic load on each WBCR radio segment. The fast forwarding code 242, is a means of by-passing certain WBCR management features. When data is being transferred from one WBCR to the next and the data is not being used by the local user, fast forwarding code can be used to expedite the data transfer process.

The remote data caching 236, information services such as the World Wide Web often results in the retransmission of regularly used files. Remote data caching 8, examines cacheable protocols like hypertext transfer protocol (HTTP) and domain name system (DNS), using embedded expiration data to determine if the files involved can be buffered for future use, without the need to contact the original host again. The WBCR can communicate cache information with its neighbors via the RFC 2186 internet cache protocol, thus a distributed object cache can flow throughout the local network instead of being limited to a single node. Dynamically adjusting the contents of a data cache, by keeping "popular" data locally, reduces the overall requirements for remote backbone bandwidth.

The management software 230, provides for remote administration. Remote administration of the WBCR is possible by a high level encryption scheme and secure ports. Security keys are generated on a regular time period (e.g. every 60 minutes) to ensure that no key is active long enough to be broken. Initial keys are exchanged by an encrypted password, so that no passwords appear in cleartext on any network.

The simple network management protocol (SNMP) 240, uses agent software embedded within each network device to collect network traffic information and device statistics. Each agent continually gathers statistics, such as the number of packets received and records them in the local WBCR system's management information base (MIB).

The load balancing 238, is another software function to ensure efficiency of data transfer in the WBCR. The total bandwidth available to any single WBCR is limited only by the number of connections it has to other segments of the network. Since each individual link has an available bandwidth that is typically smaller than the backbone connectivity for the network as a whole, a load balancing mechanism is used for optimizing the total system throughput. This allows the creation of bandwidth on demand, by routing excess traffic through links that would otherwise be underutilized.

The management software 230 provides for automatic link testing. Radio segments are automatically tested at regular intervals to confirm the viability of the specific link. This test is conducted at the data link level by sending special control data packets to a specified designation, which then turns the data packets around and echoes them back to the source node. Each control packet has a sequence number that allows the sender WBCR to know whether packets were lost either on the way to the destination, or on the way back to the source node. Link tests are conducted in the multi-cast mode and the uni-cast mode. In the multi-cast mode, the actual number of packets lost are measured, not retransmitted. In the uni-cast mode, lost data packets are retransmitted. Transmission times are measured based on the number of retries that were conducted, to achieve error-free transfer of the packet sequence. Lost packet percentages of up to 10 percent will provide adequate performance with negligible drop in throughput speed. The link test serves to isolate problem links and steer traffic away from the problem links. Since the integrated WBCR spread spectrum techniques allow reprogramming of the wireless link parameters, the regular automatic tests also allow a more advanced scheme for avoiding interference. Individual hops that prove to be problematic can be avoided by dynamically testing sequences to minimize any link disruption. Storing historical data on link behavior also allows predictive reprogramming around regularly occurring events (i.e. automatically avoiding RF frequencies susceptible to interference from various sources). Since the "hot spots" are determined through constant testing and corresponding training, the need for expensive and time consuming spectrum analysis capabilities are eliminated.

Figure 5:
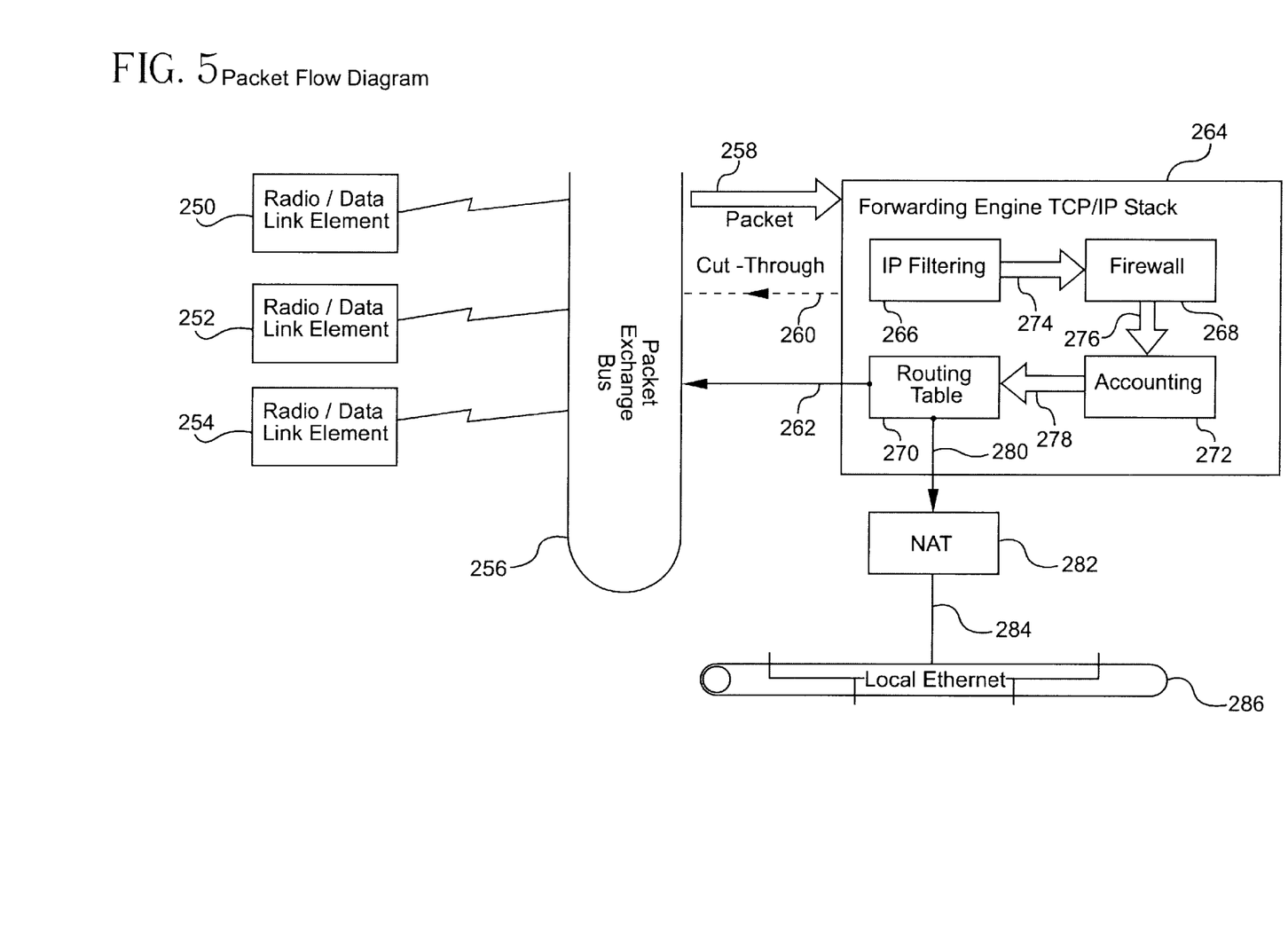
FIG. 5 is a block diagram/flowchart of a wireless burstable communications repeater data packet flow.

The data packet flow diagram, FIG. 5, illustrates the order in which software modules in the WBCR system are accessed. Data packets appear on the radio/data link element circuit 250 and are processed by the forwarding engine transmission control protocol/internet protocol (TCP/IP) stack 264. The TCP/IP stack is based upon industry standard IP source code, such as in a Unix System V R4 system. Implementing advanced cut-through 260 capabilities, allows packets obviously destined for other radio elements (determined from the destination MAC address) to exit directly without going through the overhead timing of the stack itself Since the destination MAC address is within the first 12 bytes of the packet, fast-forwarding 242, FIG. 4, to the next radio can be started before the packet is fully received in memory, which reduces latency for multiple-hop routes. For more typical packets, IP filtering 266 automatically drops (destroys) incorrectly formed packets or those which the system has been programmed to reject. The firewall 268, drops packets that don't meet its rules for valid traffic. Accounting 272, keeps track of all traffic through the system, for the purposes of billing, QoS, or monitoring. The routing table 270, determines whether data packets should be sent back to the packet exchange bus for delivery to another radio, or if they should be delivered to the local Ethernet. Network address translation 282 renumbers the IP address on local traffic before it is delivered to the Ethernet.

What is claimed is:

1. A wireless high speed data communication system comprising:
    a host radio station being operatively coupled to a source of data;
    a plurality of wireless communication repeaters wherein each repeater is adapted for two way wireless full-duplex communication with at least one of the host radio station and another repeater within a line-of-sight of the repeater to enable communication between the host radio station and repeaters beyond a line-of-sight of the host radio station; and
    at least one end user in communication with at least one of the plurality of wireless communication repeaters, wherein the host radio station transmits the data to the at least one end user via the plurality of wireless communication repeaters, at least a first control data packet being transmitted from a source node to a destination node, at least a second control data packet being transmitted from the destination node to the source node in response to the destination node receiving the first control data packet, the source node and the destination node including at least one of the host radio station and the plurality of wireless communication repeaters, the first control data packet including a first sequence number associated therewith, the second control data packet including a second sequence number associated therewith, the first and second sequence numbers distinguishing the first control data packet from the second control data packet, thereby enabling at least one of the source node and the destination node to identify an inoperable portion of a wireless link between the source node and the destination node.

2. A wireless high speed data communication system as defined in claim 1, wherein the host radio station is capable of transmitting data to a plurality of wireless communication repeaters within a line-of-sight thereof to create a series of communication links.

3. A wireless high speed data communication system as defined in claim 1, wherein the plurality of wireless communication repeaters are adapted to communicate with the at least one end user by at least one of a direct electrical connection and wireless connection within a line-of-sight of at least one of the plurality of wireless communication repeaters.

4. A wireless high speed data communication system as defined in claim 3, wherein the end-user is operatively coupled to a local area network for distribution of the data.

5. A wireless high speed data communication system as defined in claim 1, wherein the source of data is the Internet.

6. A wireless high speed data communication system as defined in claim 1, wherein at least one of the plurality of wireless communication repeaters comprises a first radio transceiver for providing a communication link to the host radio station, a processor having a memory associated therewith, the processor being operatively coupled to the radio transceiver and providing control signals thereto and means for communicating with the at least one end-user.

7. A wireless high speed data communication system as defined in claim 6, wherein the communicating means comprises a wired connection.

8. A wireless high speed data communication system as defined in claim 7, wherein the wired connection includes an Ethernet interface.

9. A wireless high speed data communication system as defined in claim 6, wherein the communicating means comprises a second radio transceiver for providing a wireless communication link to a remote end-user within a line-of-sight of at least one of the plurality of wireless communication repeaters.

10. A wireless high speed data communication system as defined in claim 9, wherein the second radio transceiver is configured to provide a wireless communication link to at least one of the plurality of wireless communication repeaters within a line-of-sight thereof.

11. A wireless high speed data communication system as defined in claim 6, wherein the data is converted into data packets for transmission to at least one of the plurality of wireless communication repeaters.

12. A wireless high speed data communication system as defined in claim 1, wherein the wireless link is tested in at least one of a multi-cast mode, the control data packets that are lost being counted in the multi-cast mode, the control data packets that are lost being retransmitted in the uni-cast mode.

13. A wireless high speed data communications system as defined in claim 12, wherein a transmission time associated with the wireless link is determined, the transmission time representing a number of control data packets that are lost in the multi-cast mode, the transmission time representing a number of control data packets that are lost in the uni-cast mode.

14. A wireless high speed data communication repeater comprising:
    at least one radio/data link element having an antenna coupled thereto being adapted for receiving and transmitting data packets in full duplex from at least one of a host computer and another wireless high speed data communication repeater, the at least one radio/data link element including a radio frequency transmitter and a radio frequency receiver;
    a medium access control circuit coupled to the at least one radio/data link element, the medium access control circuit manipulating data packets for transmission and reception, the medium access control circuit providing at least one of access to multiple radio/data link elements, channel allocation, protocol data unit (PDU) addressing, frame formatting, error checking, fragmentation, and reassembly of packets within the wireless high speed data communication repeater;
    a packet exchange bus within the wireless high speed data communication repeater through which substantially all data traffic passes through, the packet exchange bus being operatively coupled to the medium access control circuit; and
    a network control module which provides data management functions for multi-directional communication of data to and from the wireless high speed data communication repeater, the wireless high speed data communication repeater being adapted for transmitting at least a first control data packet as a source node and receiving at least a second control data packet as the source node, the repeater being adapted for receiving the first control data packet as a destination node and transmitting the second control data packet as the destination node in response to receiving the first control data packet, the first control data packet including a first sequence number associated therewith, the second control data packet including a second sequence number associated therewith, the first and second sequence numbers distinguishing the first control data packet from the second control data packet, thereby enabling at least one of the source node and the destination node to identify an inoperable portion of a wireless link from the wireless high speed data communication repeater.

15. A wireless high speed data communication repeater as defined in claim 14, wherein the at least one radio/data link element is adapted for spread spectrum communication.

16. A wireless high speed data communication repeater as defined in claim 12, wherein the spread spectrum communication includes at least one of frequency hopping and direct sequence coding schemes for resistance to at least one of jamming and interference.

17. A wireless high speed data communication repeater as defined in claim 14, wherein the network control module comprises a processor, DRAM including static and dynamic buffers for storage of temporary data, and a flash memory which includes firmware, configuration data and statistics associated with the high speed data communication repeater including at least one of data packet length, throughput, faults, and exceptions.

18. A wireless high speed data communication repeater as defined in claim 14, wherein the network control module routes data to a local network via a wired connection.

19. A wireless high speed data communication repeater as defined in claim 14, wherein the network control module routes data to a local network via a wireless communication link.

20. A wireless high speed data communication repeater as defined in claim 14, wherein the wireless link is tested in a least one of a multi-cast mode and a uni-cast mode, the control data packets that are lost being counted in the multi-cast mode, the control data packets that are lost being retransmitted in the uni-cast mode.

21. A wireless high speed data communication repeater as defined in claim 20, wherein a transmission time associated with the wireless link is determined, the transmission time representing a number of control data packets that are lost in the multi-cast mode, the transmission time representing a number of control data packets that are lost in the uni-cast mode.

22. A method of routing data in packets, the method including the steps of:
receiving data packet by a radio/data link element of at least one of a plurality of wireless communication repeaters, the at least one of a plurality of wireless communication repeaters being a portion of a system including a host radio station electrically coupled to a source data, the at least one of a plurality of wireless communication repeaters being within a line-of-sight of said host radio station and adapted for two-way wireless full-duplex communication with the host radio station, the at least one of the plurality of wireless communication repeaters including at least one radio/data link element, a packet exchange bus in communication with the at least one radio/data link element, and a forwarding engine TCP/IP stack in communication with the packet exchange bus, the forwarding engine TCP/IP stack including therein a routing table, the packet exchange bus and the forwarding engine TCP/IP enabling the system to interface with the Internet;
providing the received data packets through the packet exchange bus within the at least one of the plurality of wireless communication repeaters to the forwarding engine TCP/IP stack;
routing the received data packets addressed to the at least one of the plurality of repeaters through the forwarding engine TCP/IP stack including passing the data packets through the routing table to determine whether the received data packets should be sent back to the packet exchange bus for delivery to another repeater or to deliver the packets to an Ethernet local to the at least one of the plurality of wireless communication repeaters; and
testing a wireless link between at least two of the host radio station and the plurality of wireless repeaters by transmitting at least a first control data packet from a source node to a destination node and transmitting a second control data packet from the destination node to the source node, the source node and the destination node including at least one of the host radio station and the plurality of wireless communication repeaters, the first control data packet including a first sequence number associated therewith, the second control data packet including a second sequence number associated therewith, the first and second sequence numbers distinguishing the first control data packet from the second control data packet, thereby enabling at least one of the source node and the destination node to identify an inoperable portion of the wireless link between the source node and the destination node.

23. A method of routing data in packets as defined by claim 22, further comprising the step of:
implementing advanced cut-through capabilities to allow packets destined for other repeaters to exit the forwarding engine and be returned to the packet exchange bus in accordance with a destination address in the data packet.

24. A method of routing data in packets as defined by claim 23, further comprising the steps of:
providing an IP filter in the forwarding engine TCP/IP stack; and
filtering IP address to drop incorrectly formed packets for which the at least one of the plurality of wireless communication repeaters is not programmed to receive.

25. A method of routing data in packets as defined by claim 24, further comprising the steps of:
providing a firewall in the forwarding engine TCP/IP stack; and
passing the data packets through the firewall to drop packets that do not meet predetermined criteria.

26. A method of routing data in packets as defined by claim 25, further comprising the steps of:
providing an accounting means in the forwarding engine TCP/IP stack; and
passing the data packets through the accounting means to monitor traffic for at least one of billing and quality of service.

27. A method of routing data in packets as defined in claim 22, further including the steps of:
testing the wireless link in at least one of a multi-cast mode and a uni-cast mode;
counting control data packets that are lost in the multi-cast mode; and
retransmitting the control data packets that are lost in the uni-cast mode.

28. A method of routing data in packets as defined in claim 27, further comprising the step of determining a transmission time associated with the wireless link, the transmission time representing a number of control data packets that are lost in the multi-cast mode, the transmission time representing a number of control data packets that are lost in the uni-cast mode.

* * * * *

UNITED STATES PATENT AND TRADEMARK OFFICE
CERTIFICATE OF CORRECTION

PATENT NO. : 6,584,080 B1
DATED : June 24, 2003
INVENTOR(S) : Ganz et al.

It is certified that error appears in the above-identified patent and that said Letters Patent is hereby corrected as shown below:

<u>Column 14,</u>
Line 20, now reads "one of a multi-cast mode, the control" should read -- one of a multi-cast mode and a uni-cast mode, the control --;

<u>Column 15,</u>
Line 15, now reads "data, and a flash" should read -- data, and flash --;

Signed and Sealed this

Fourth Day of November, 2003

JAMES E. ROGAN
*Director of the United States Patent and Trademark Office*